(12) United States Patent
Nakamura

(10) Patent No.: US 10,092,960 B2
(45) Date of Patent: Oct. 9, 2018

(54) CHUCK DEVICE

(71) Applicant: JACOBS CHUCK MANUFACTURING (SUZHOU) CO., LTD., Suzhou (CN)

(72) Inventor: Daijiro Nakamura, Kobe (JP)

(73) Assignee: Jacobs Chuck Manufacturing (Suzhou) Co., Ltd., Suzhou (CN)

( * ) Notice: Subject to any disclaimer, the term of this patent is extended or adjusted under 35 U.S.C. 154(b) by 0 days.

(21) Appl. No.: 15/317,473

(22) PCT Filed: Jan. 13, 2015

(86) PCT No.: PCT/JP2015/050624
§ 371 (c)(1),
(2) Date: Feb. 23, 2017

(87) PCT Pub. No.: WO2015/190120
PCT Pub. Date: Dec. 17, 2015

(65) Prior Publication Data
US 2017/0225235 A1    Aug. 10, 2017

(30) Foreign Application Priority Data
Jun. 10, 2014 (JP) ................. 2014-119204

(51) Int. Cl.
*B23B 31/12* (2006.01)

(52) U.S. Cl.
CPC ........ *B23B 31/1238* (2013.01); *B23B 31/123* (2013.01); *B23B 2231/38* (2013.01);
(Continued)

(58) Field of Classification Search
CPC ............... B23B 31/123; B23B 31/1238; Y10T 279/17615; Y10T 279/17623; Y10T 279/17632
See application file for complete search history.

(56) References Cited

U.S. PATENT DOCUMENTS 5,816,582 A * 10/1998 Steadings ............. B23B 31/123
279/140
6,390,481 B1 * 5/2002 Nakamuro ............ B23B 31/123
279/140
(Continued)

FOREIGN PATENT DOCUMENTS

| JP | 03136706 A | 6/1991 |
| JP | 2010-260122 A | 11/2010 |
| JP | 2013-255949 A | 12/2013 |

OTHER PUBLICATIONS

International Search Report and Written Opinion of PCT/JP2015/050624 dated Mar. 17, 2015, all enclosed pages cited.
(Continued)

*Primary Examiner* — Eric A Gates
(74) *Attorney, Agent, or Firm* — McNair Law Firm, P.A.

(57) ABSTRACT

[Problem]
A chuck device capable of reliable locking with a simple structure is provided.
[Solution]
A chuck device (1) including a plurality of balls (41); a retainer (42) which holds the balls (41) so as to be rolled; a spring ring (34) configured to rotate together with a nut ring (33) and to switch between a rotation restricted state in which the retainer (42) is restricted in a loosening direction (L) and a restriction released state in which the restriction of the retainer (42) in the loosening direction (L) is released; and a one-way spring (31) which restricts the retainer (42) in the loosening direction (L) relative to a chuck body (11), in which the plurality of balls (41), the retainer (42) and the one-way spring (31) configure a one-way bearing mechanism (50) restricted in the loosening direction (L) provided between the nut ring (33) and the chuck body (11), and the
(Continued)

retainer (42) in the rotation restricted state configures a bearing and lock mechanism (30).

7 Claims, 10 Drawing Sheets

(52) U.S. Cl.
CPC ... *B23B 2260/008* (2013.01); *B23B 2260/106* (2013.01); *Y10T 279/17632* (2015.01)

(56) References Cited

U.S. PATENT DOCUMENTS

| | | | | |
|---|---|---|---|---|
| 6,572,310 | B2* | 6/2003 | Temple-Wilson | ............................ B23B 31/1238 408/239 A |
| 7,360,770 | B2* | 4/2008 | Luckenbaugh | ....... B23B 31/123 279/140 |
| 7,527,273 | B2* | 5/2009 | Bordeianu | ............ B23B 31/123 279/140 |
| 7,708,288 | B2* | 5/2010 | Bordeianu | ............ B23B 31/123 279/140 |
| 7,845,651 | B2* | 12/2010 | Yaksich | ................ B23B 31/123 279/140 |
| 7,900,937 | B2* | 3/2011 | Yaksich | ................ B23B 31/123 279/140 |
| 8,376,371 | B2* | 2/2013 | Young | ................ B23B 31/1215 279/123 |
| 8,641,048 | B2* | 2/2014 | Garber | .................. B23B 31/123 279/140 |
| 9,016,699 | B2* | 4/2015 | Sakamaki | ............ B23B 31/123 279/62 |
| 2006/0232023 | A1* | 10/2006 | Yaksich | .............. B23B 31/1238 279/62 |
| 2007/0052182 | A1 | 3/2007 | Bordeianu | |
| 2014/0077463 | A1* | 3/2014 | Mason | .................. B23B 31/123 279/62 |

OTHER PUBLICATIONS

Chapter I International Preliminary Report on Patentability of PCT/JP2015/050624 dated Dec. 15, 2016, all enclosed pages cited.

* cited by examiner

CHUCK DEVICE

TECHNICAL FIELD

The present invention relates to a chuck device which tightens and fixes a rotating jig such as a driver jig, a drill jig or the like with a base shaft thereof inserted into, for example, an electric tool such as an electric screw driver, a vibration drill or the like.

BACKGROUND ART

As a chuck device arranged at a front end of an electric screw driver or the like, there has been conventionally proposed a chuck device having a lock mechanism which tightens and fixes a base shaft of an inserted rotating jig by pawls (jaws) from three sides to lock the rotating jig in a tightened state (see Patent Literature 1).

The chuck device includes an engaging ring with a shaft direction restrained relative to a chuck main body, and a holding ring movable in the shaft direction relative to a ratchet main body. Then, on opposed surfaces of the engaging ring and the holding ring, ratchet gears meshing with each other in a loosening direction are formed.

Accordingly, it is assumed that moving the holding ring in the shaft direction to make the ratchet gears of the engaging ring and the holding ring mesh with each other enables rotation, in a tightened and fixed state, to be restricted in a tightening release direction, thereby locking a tightened state.

However, when a rotating jig, locked in the tightened state by a lock mechanism, is rotationally driven for drilling or the like, in which state, a base shaft of the rotating jig is fixed by jaws from three directions, resonance or inertial force due to vibration might cause a rotation input body to rotate in the tightening release direction to carelessly release a rotation restricted state.

CITATIONS LIST

Patent Literature

Patent Literature 1: JP H06-277913 A

SUMMARY OF INVENTION

Technical Problems

Thus, the present invention aims at providing a chuck device capable of reliable locking with a simple structure.

Solutions to Problems

The present invention is a chuck device to be attached to a driving device having a driving shaft rotatable on an axis, the chuck device including a generally cylindrical chuck main body arranged on the axis and having a shaft hole at a front end side thereof, the shaft hole allowing insertion of a base shaft of a rotating jig; a plurality of chuck pawls which communicate with the shaft hole at the front end side in the chuck main body, which, at a rear end side, are inserted into a slanting hole opened in a side of the chuck main body, and which are arranged movably relative to the chuck main body; a nut ring which moves the plurality of chuck pawls in synchronization with each other in a slanting direction in the slanting hole by screwing with the chuck main body and the chuck pawls; a plurality of rolling bodies which roll while being sandwiched between the nut ring and the chuck main body; a retainer which holds the plurality of rolling bodies so as to be rolled while being aligned, the retainer being rotatable relative to the chuck main body and the nut ring; a first rotation restriction body configured to rotate together with the nut ring and to switch between a rotation restricted state in which rotation of the retainer in a loosening direction is restricted and a restriction released state in which the restriction of the rotation of the retainer in the loosening direction is released; and a second rotation restriction body which restricts the rotation of the retainer in the loosening direction relative to the chuck main body, in which the plurality of rolling bodies, the retainer, and the second rotation restriction body configure a bearing mechanism between the nut ring and the chuck main body, the bearing mechanism having rotation in a loosening direction being restricted, and the retainer, the rolling bodies, and the first rotation restriction body in the rotation restricted state configure a lock mechanism using the rolling bodies sandwiched between the nut ring and the chuck main body as rotation loads.

The above driving device having a rotatable driving shaft may be a rotational electric tool such as a vibration drill, an electric screw driver or the like.

The above rotating jig may be a drill jig which rotates, and a plus or slotted driver jig, or the like.

A base shaft of the above rotating jig is also called a tool shank and the above chuck pawl is also called a jaw. The above rolling bodies can be configured with, for example, any cylindrical or abacus-shaped rolling bodes, or any spherical bodies that can be sandwiched between the nut ring and the chuck main body and held to be rolled while being aligned by the retainer.

According to the present invention, in the chuck device including the chuck main body, the chuck pawls, the nut ring, the plurality of rolling bodes, the second rotation restriction body, the retainer, and the first rotation restriction body configured to switch between the rotation restricted state in which rotation of the retainer in the loosening direction is restricted and the restriction released state in which the restriction of the rotation of the retainer in the loosening direction is released, the plurality of rolling bodies, the second rotation restriction body and the retainer configure a bearing mechanism functioning between the nut ring and the chuck main body in the restriction released state obtained by the first rotation restriction body, and the retainer configures the lock mechanism with the rolling bodies sandwiched between the nut ring and the chuck main body used as rotation loads in the rotation restricted state obtained by the first rotation restriction body, thereby reliably locking a holding state where the base shaft of the rotating jig is held without carelessly releasing the holding state.

Specifically, since in the restriction released state obtained by the first rotation restriction body capable of switching the retainer between the rotation restricted state in which rotation in the loosening direction is restricted and the restriction released state, with the retainer which holds the plurality of rolling bodies so as to be rolled while being aligned, the plurality of rolling bodies rolling while being sandwiched between the nut ring and the chuck main body, and the nut ring moving the plurality of chuck pawls in synchronization with each other in the slanting direction in the slanting hole, the plurality of rolling bodies, the second rotation restriction body and the retainer configure the bearing mechanism functioning between the nut ring and the chuck main body, the nut ring can be smoothly rotated relative to the chuck main body so as to move the chuck pawls in synchronization with each other in the slanting direction in the slanting hole.

Conversely, for example, when the chuck pawls are moved and in the holding state where the base shaft of the rotating jig is held, the first rotation restriction body is switched to the rotation restricted state, the retainer configures the bearing mechanism using the rolling bodies sandwiched between the nut ring and the chuck main body as rotation loads, so that the above holding state of the base shaft can be locked.

To be more specifically described, when the rolling bodies and the retainer function as a bearing as described above, due to rotation of the nut ring relative to the chuck main body, the plurality of rolling bodies sandwiched between the chuck main body and the nut ring rolls (rotation and revolution) while being aligned in the retainer. Accordingly, the nut ring is allowed to smoothly rotate relative to the chuck main body.

At this time, the retainer, which holds the plurality of rolling bodies so as to be rolled while being sandwiched between the chuck main body and the nut ring, rotates relative to the chuck main body as the rolling bodies roll, with a delay after relative rotation of the nut ring. In other words, while the nut ring and the retainer both rotate in the same direction relative to the chuck main body, the retainer, which makes relative rotation with a delay after relative rotation of the nut ring, rotates differentially relative to the nut ring.

However, in the rotation restricted state, the retainer and the nut ring rotate in conjunction in the loosening direction. Thus, along with the rotation of the nut ring relative to the chuck main body, the retainer is about to make relative rotation together with the plurality of aligned rolling bodies. However, since the plurality of rolling bodies aligned in the retainer is sandwiched between the chuck main body and the nut ring to generate friction between both contact parts, relative rotation of the retainer prevents the rolling bodies from rolling. In other words, although the retainer is to rotate relative to the chuck main body while dragging the rolling bodies that are sandwiched between the nut ring and the chuck main body and not allowed to rotate, frictional force of the rolling bodies enables the retainer, i.e. relative rotation of the nut ring to be locked.

Further, since the second rotation restriction body restricts rotation of the retainer relative to the chuck main body in the loosening direction, a locked state can be more reliably realized in combination with locking by the retainer with the rolling bodies sandwiched between the nut ring and the chuck main body as rotation loads.

Thus, according to the configuration of the present invention, depending on a state of the first rotation restriction body, the plurality of rolling bodies and the retainer realize both the bearing mechanism provided between the nut ring and the chuck main body, and the lock mechanism with the rolling bodies as rotation loads.

As a mode of the present invention, the retainer may be formed to have a ring-shape and have an inner circumferential ratchet gear provided on a circumference thereof, rotation-fixing means may be provided which rotation-fixes the second rotation restriction body to the chuck main body, and the second rotation restriction body may include a second engaging pawl which engages with the inner circumferential ratchet gear of the retainer.

According to the present invention, engagement of the second engaging pawl of the second rotation restriction body with the inner circumferential ratchet gear of the retainer enables rotation of the retainer having the ratchet gear to be restricted relative to the chuck main body in the loosening direction via the rotation-fixing means and the second rotation restriction body. Accordingly, with a simple structure, rotation in a tightening direction R relative to the chuck main body can be allowed and rotation of the retainer in the loosening direction can be restricted.

Additionally, as a mode of the present invention, the rotation-fixing means may be configured with a ring-shaped rotation-fixing ring which is rotation-fixed to the chuck main body, and the second rotation restriction body may be formed to have a ring-shape and to be rotatably attached to the chuck main body, so that the second rotation restriction body may be configured to be rotation-fixed to the chuck main body, with the second rotation restriction body sandwiched between the rotation-fixing ring and the chuck main body using the nut ring screwed into the chuck main body and the chuck pawls as reaction force.

According to the present invention, in a state where the base shaft is held by the chuck pawls, rotation of the retainer in the loosening direction relative to the chuck main body can be restricted via the second rotation restriction body and in other states, the retainer can be rotatable relative to the chuck main body.

To be described in detail, since the rotation-fixing means is configured with a ring-shaped rotation-fixing ring which is rotation-fixed to the chuck main body, and the second rotation restriction body is formed to have a ring-shape and to be rotatably attached to the chuck main body, so that the second rotation restriction body is configured to be rotation-fixed to the chuck main body, with the second rotation restriction body sandwiched between the rotation-fixing ring and the chuck main body using the nut ring screwed into the chuck main body and the chuck pawls as reaction force, before the chuck pawls hold the base shaft as a result of screwing of the nut ring, with the nut ring as reaction force, the second rotation restriction body is not sandwiched between the rotation-fixing ring and the chuck main body, which makes the second rotation restriction body rotatable relative to the chuck main body.

Therefore, the retainer is not restricted in the loosening direction relative to the chuck main body. By contrast, when the nut ring is clamped to hold the base shaft with the chuck pawls, with the nut ring as reaction force, the second rotation restriction body is sandwiched between the rotation-fixing ring and the chuck main body, so that the second rotation restriction body is fixed to the chuck main body. Thus, the retainer will have rotation restricted in the loosening direction relative to the chuck main body via the second rotation restriction body fixed to the chuck main body.

Thus, since under a condition where the chuck pawls hold and fix the base shaft, rotation of the retainer is restricted in the loosening direction relative to the chuck main body via the second rotation restriction body rotation-fixed to the chuck main body and under a condition where the chuck pawls fail to hold the base shaft, the second rotation restriction body is rotatable relative to the chuck pawls, the retainer can be rotatable relative to the chuck main body. Accordingly, with a simple structure, rotation can be restricted only when rotation of the retainer needs to be restricted relative to the chuck main body.

As a mode of the present invention, an outer circumferential ratchet gear may be provided on an outer circumference of the ring-shaped retainer, and the first rotation restriction body may include a first engaging pawl which engages with the retainer via the outer circumferential ratchet gear in the rotation restricted state and separates from the outer circumferential ratchet gear to release engagement in the restriction released state.

According to the present invention, a rotation restricted state can be reliably switched with ease with a simple structure.

To be described in detail, since the outer circumferential ratchet gear is provided on the outer circumference of the ring-shaped retainer, and the first rotation restriction body is provided with the first engaging paw, engaging, with the outer circumference ratchet gear, the first engaging pawl of the first rotation restriction body which rotates together with the nut ring makes relative rotation of the retainer and the nut ring in the loosening direction be restricted, and releasing an engagement of the first engaging pawl with the outer circumference ratchet gear makes the retainer and the nut ring be relatively rotatable each other, thereby enabling the rotation restricted state to be easily switched.

As a mode of the present invention, a rotation input body may be provided which is rotatably attached to the chuck main body, and which applies rotation force to the nut ring by rotation operation and allows the nut ring and the first rotation restriction body to differentially move in a rotation direction of a predetermined angle, in which the first rotation restriction body may be configured to switch between the rotation restricted state and the restriction released state by differential rotation relative to the rotation input body.

According to the present invention, the rotation restricted state and the restriction released state can be reliably switched with a simple structure.

As a mode of the present invention, the rolling bodies may be each configured with a ball, and the ball, the retainer and the second rotation restriction body may configure a one-way ball bearing which functions between the nut ring and the chuck main body.

According to the present invention, the rotation restricted state and the restriction released state can be more reliably switched with a simpler structure.

Advantageous Effects Of Invention

According to the present invention, a chuck device capable of reliable locking with a simple structure can be provided.

DESCRIPTION OF EMBODIMENT

One embodiment of the present invention will be described with reference to the drawings in the following.

Figure 1:
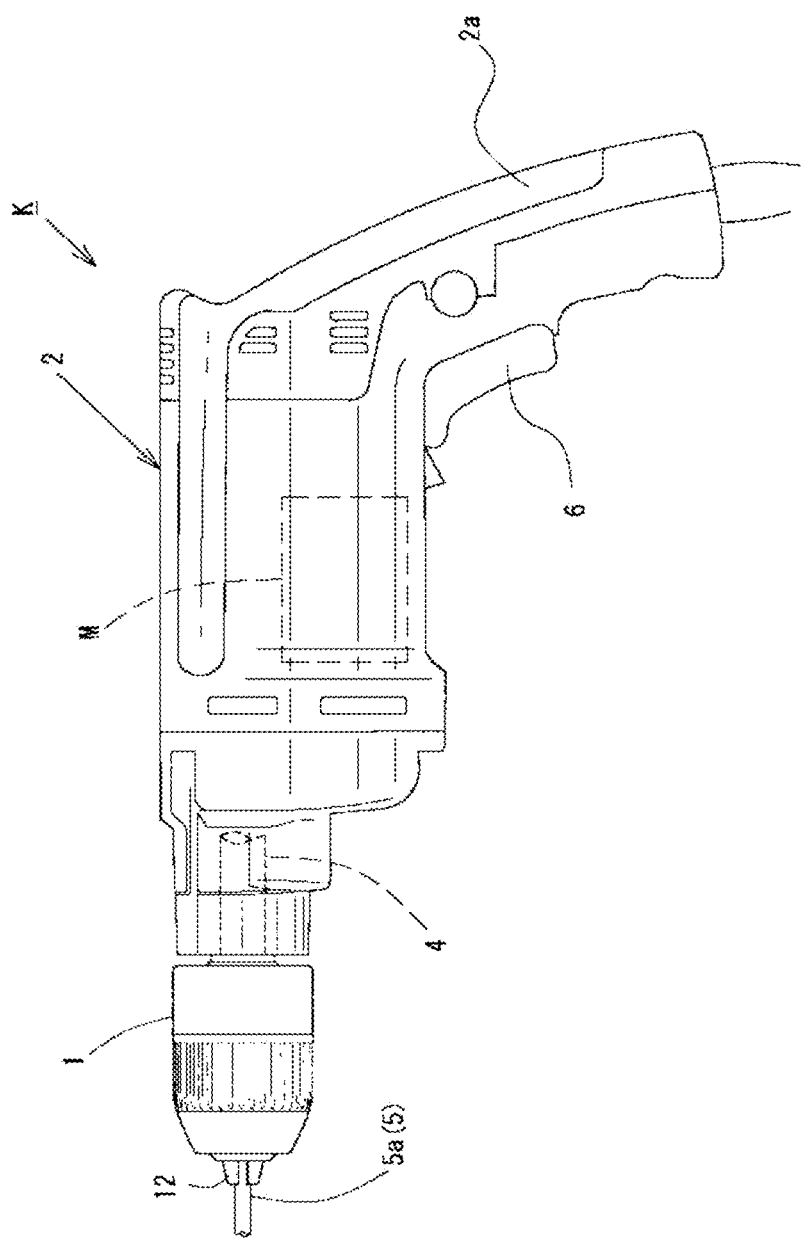
FIG. 1 is a front view of an electric tool including a chuck device.
Figure 2:
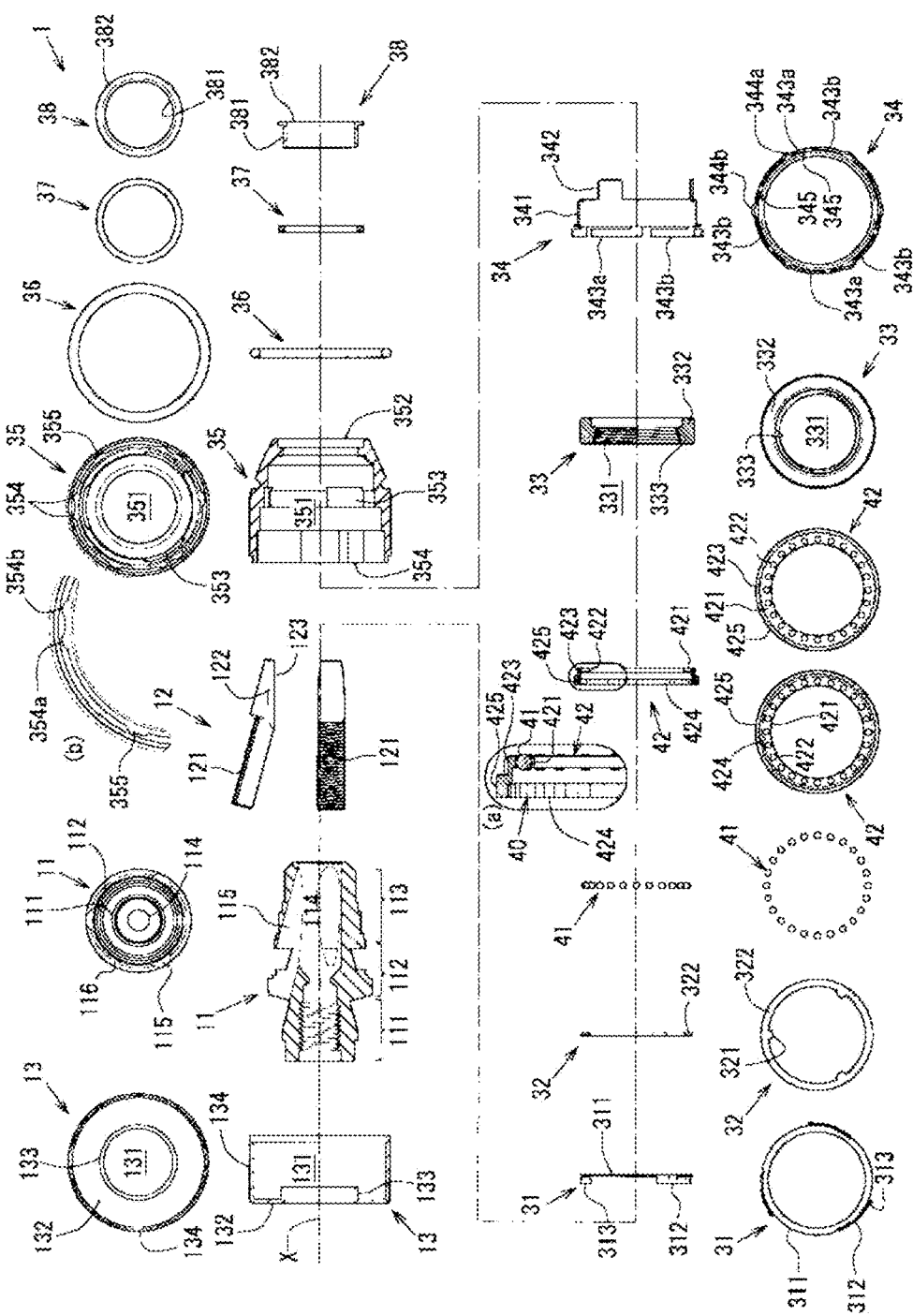
FIG. 2 is an exploded view for explaining each component of the chuck device, with a front, a back, a side and a section thereof shown.

FIG. 1 is a front view of an electric tool K including a chuck device 1, and FIG. 2 is an exploded view for explaining each component of the chuck device 1, with a front, a back, a side and a section thereof shown.

To be described in detail, in FIG. 2, a chuck body 11, a back sleeve 13, a bearing ring 32, balls 41 configuring a ball bearing 40, a nut ring 33, a sleeve O ring 36, an O ring 37 and a nose piece 38 are shown in front views and sectional views, a one-way spring 31, a spring ring 34 and a sleeve 35 are shown in back views and sectional views, and a retainer 42 configuring the ball bearing 40 is shown in a sectional view, a front view and a back view. A jaw 12, when arranged in three directions, is shown in a side view.

Figure 3:
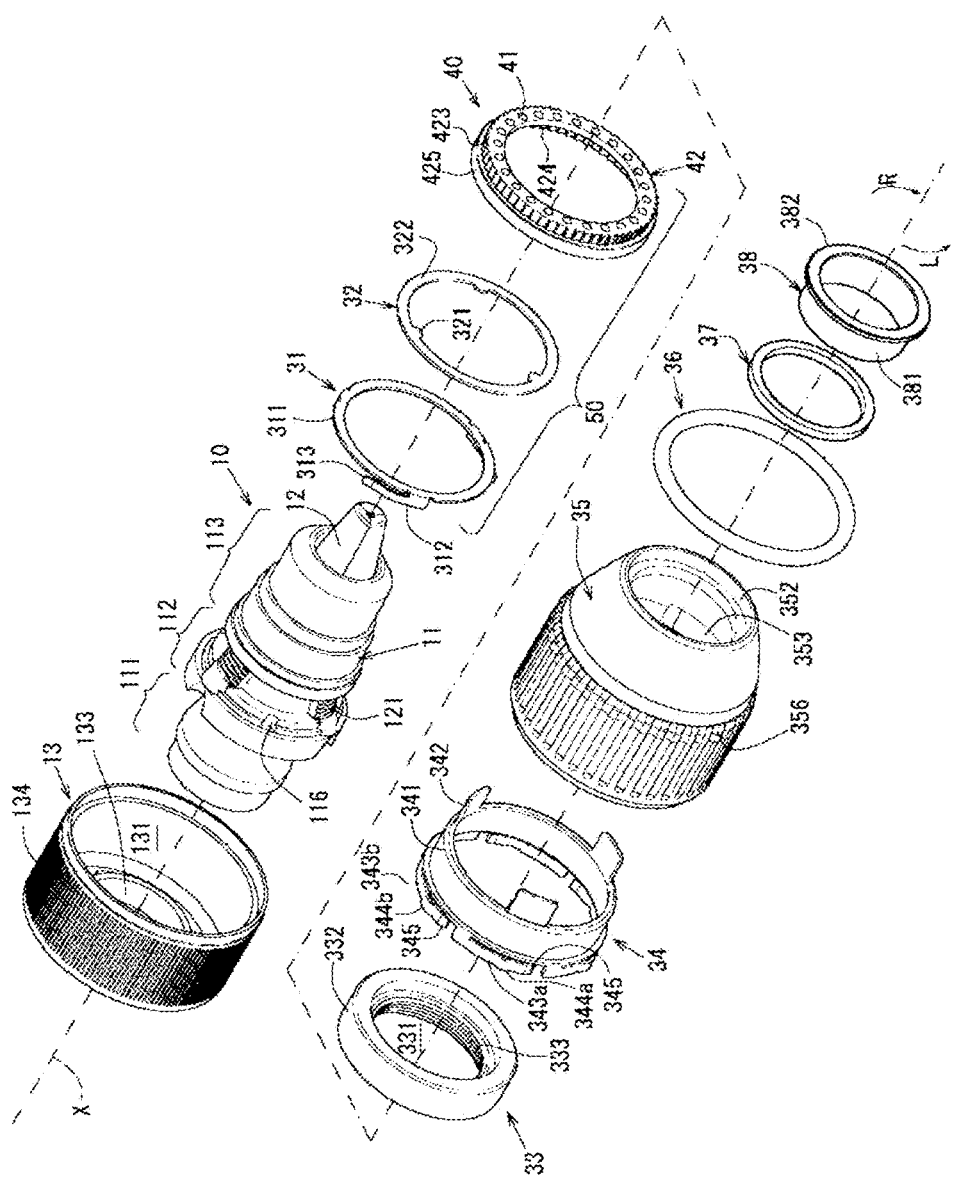
FIG. 3 is an exploded perspective view of each component of the chuck device seen from a front side thereof.
Figure 4:
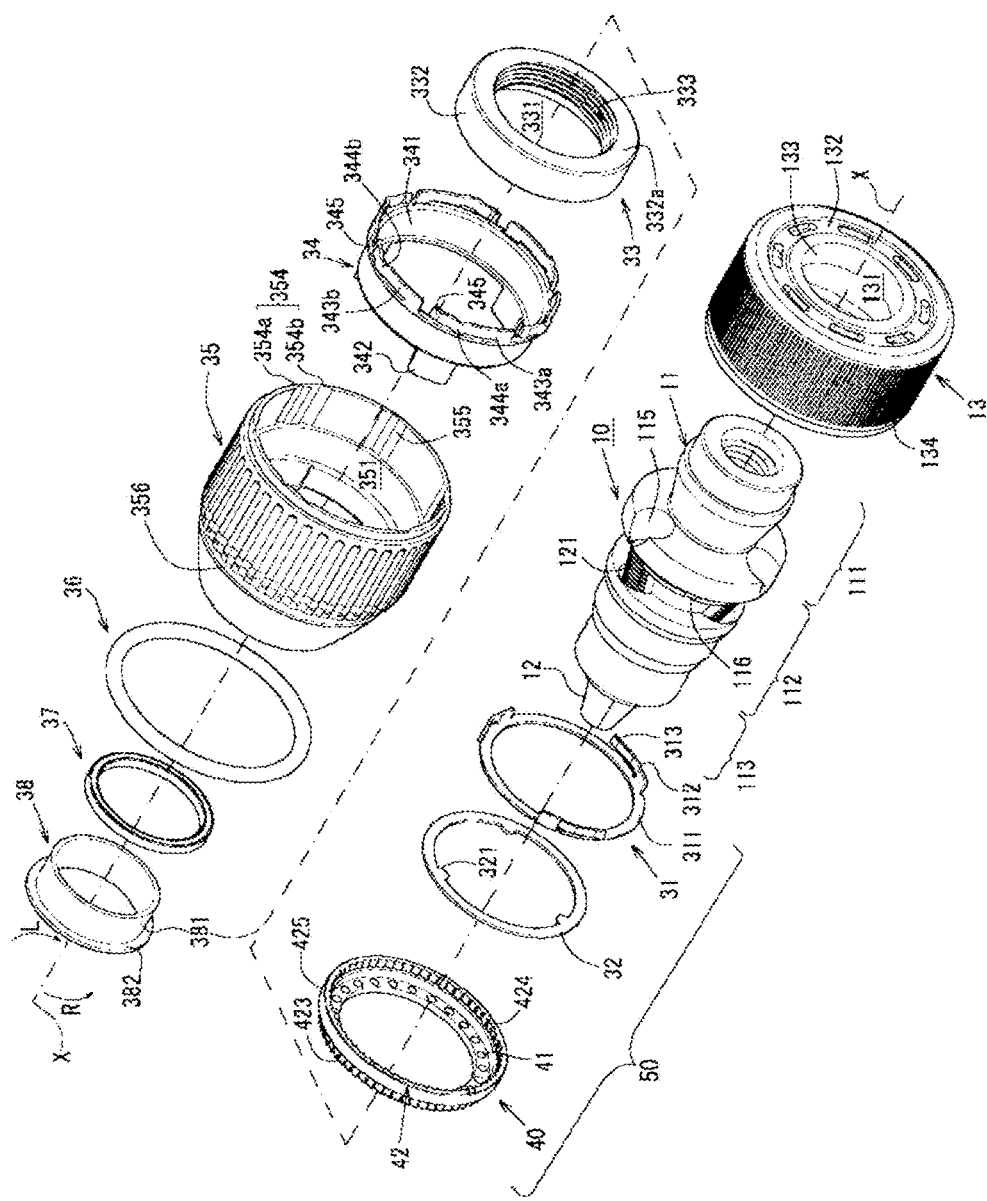
FIG. 4 is an exploded perspective view of each component of the chuck device seen from a back side thereof.
Figure 5:
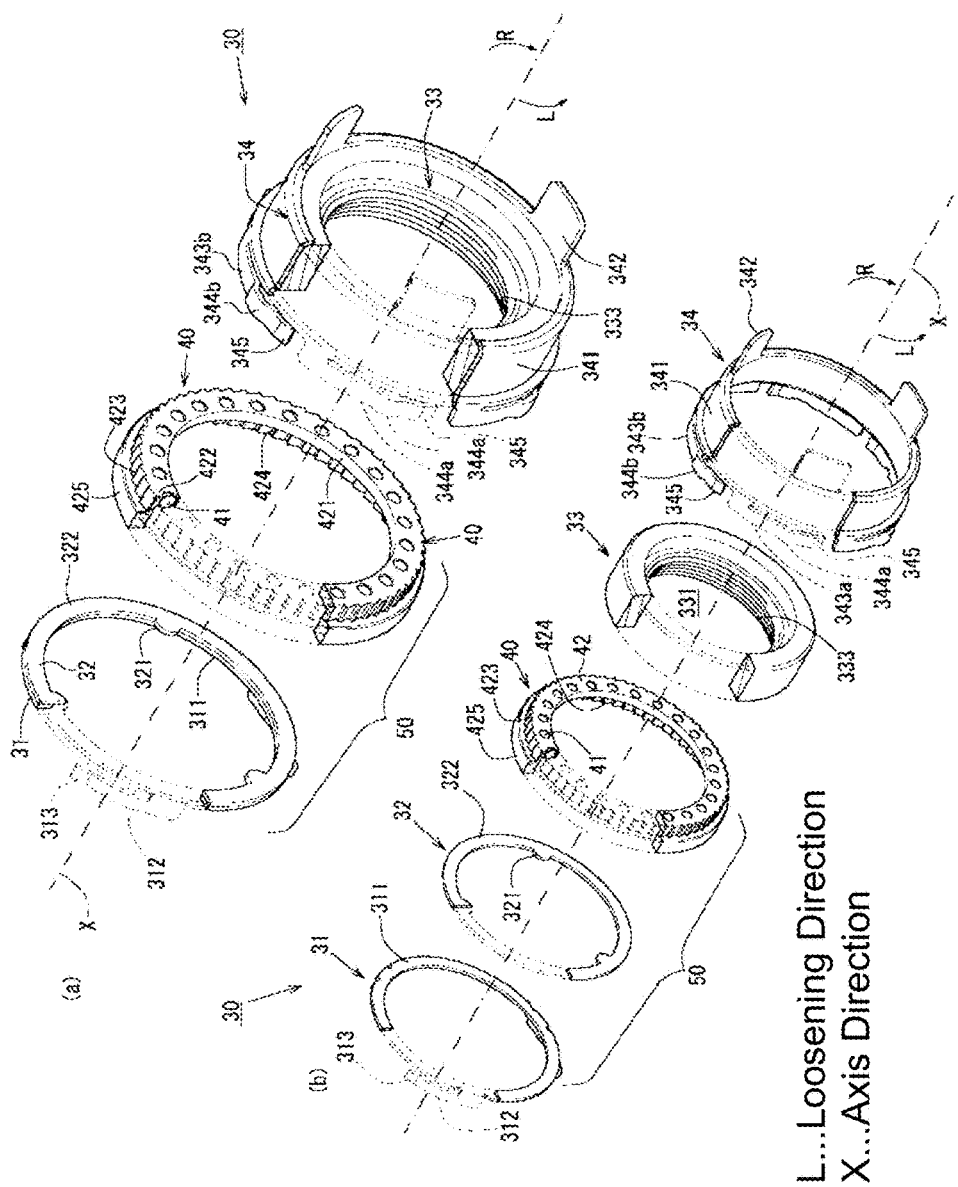
FIG. 5 is an exploded perspective view of each component of a bearing and lock mechanism seen from a front side thereof.
Figure 6:
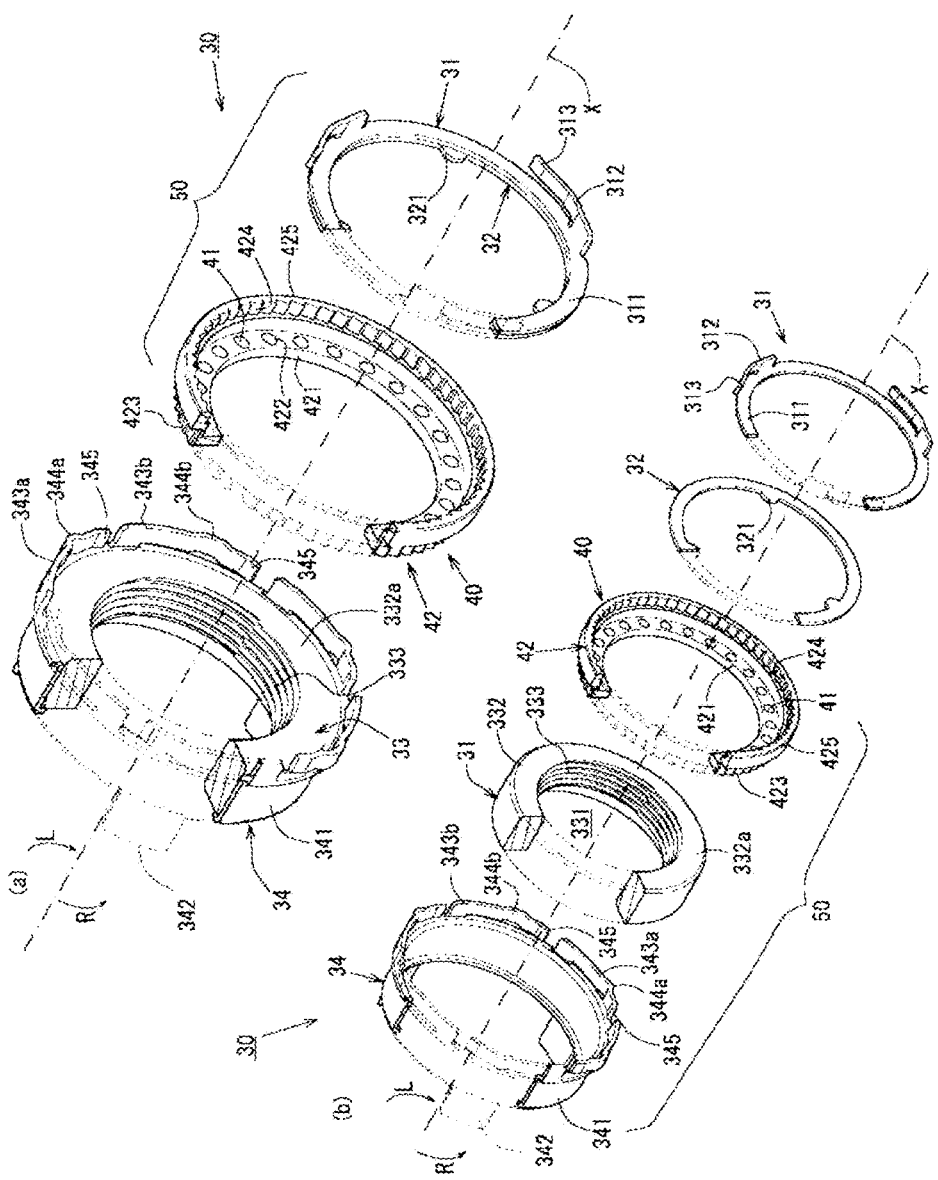
FIG. 6 is an exploded perspective view of each component of the bearing and lock mechanism seen from a back side thereof.
Figure 7:
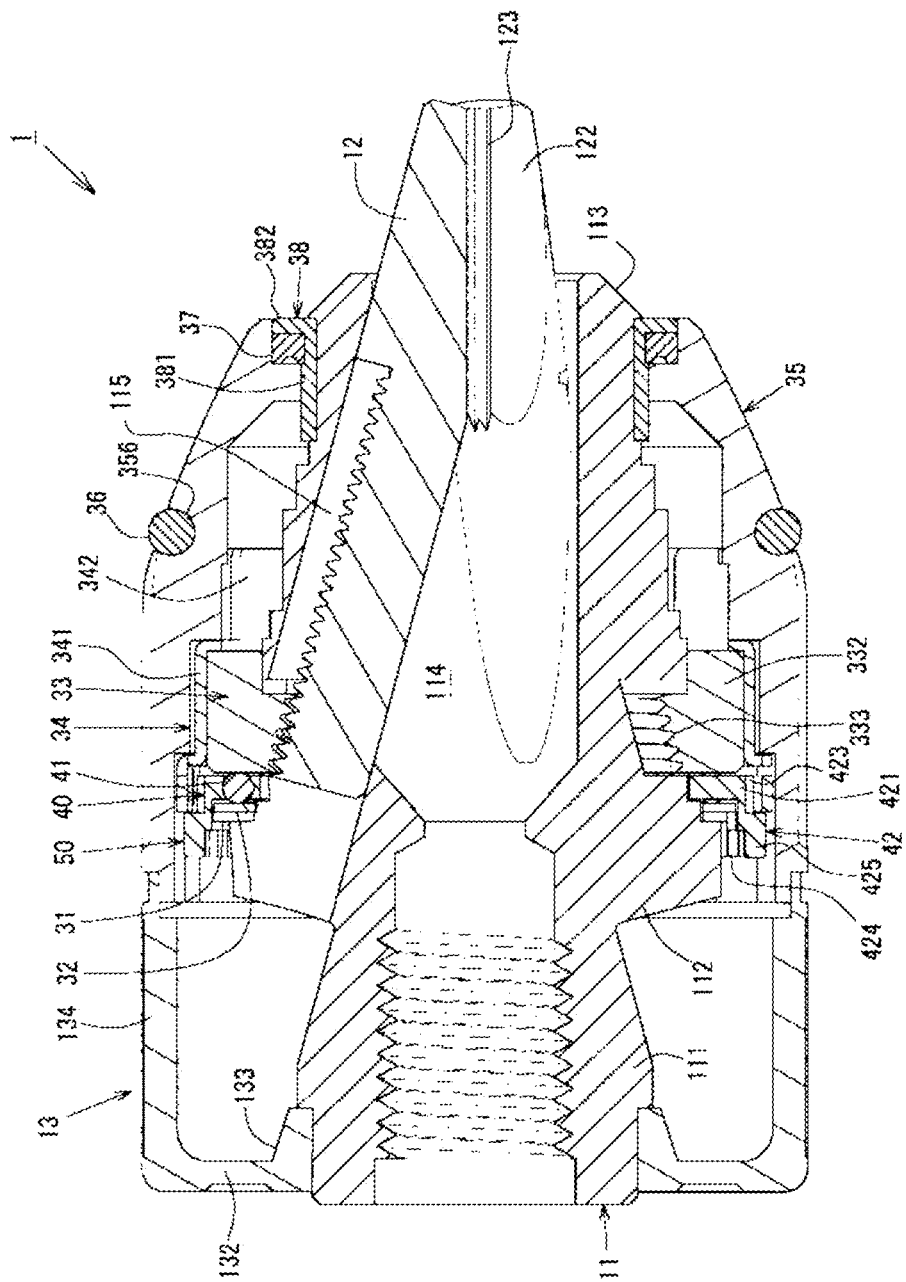
FIG. 7 is a vertical sectional view of the chuck device.

FIG. 3 is an exploded perspective view of each component of the chuck device 1 seen from a front side thereof, FIG. 4 is an exploded perspective view of each component of the chuck device 1 seen from a back side thereof, FIG. 5 is an exploded perspective view of each component of a bearing and lock mechanism 30 seen from a front side thereof, FIG. 6 is an exploded perspective view of each component of the bearing and lock mechanism 30 seen from a back side thereof, and FIG. 7 is a vertical sectional view of the chuck device 1.

Figure 8:
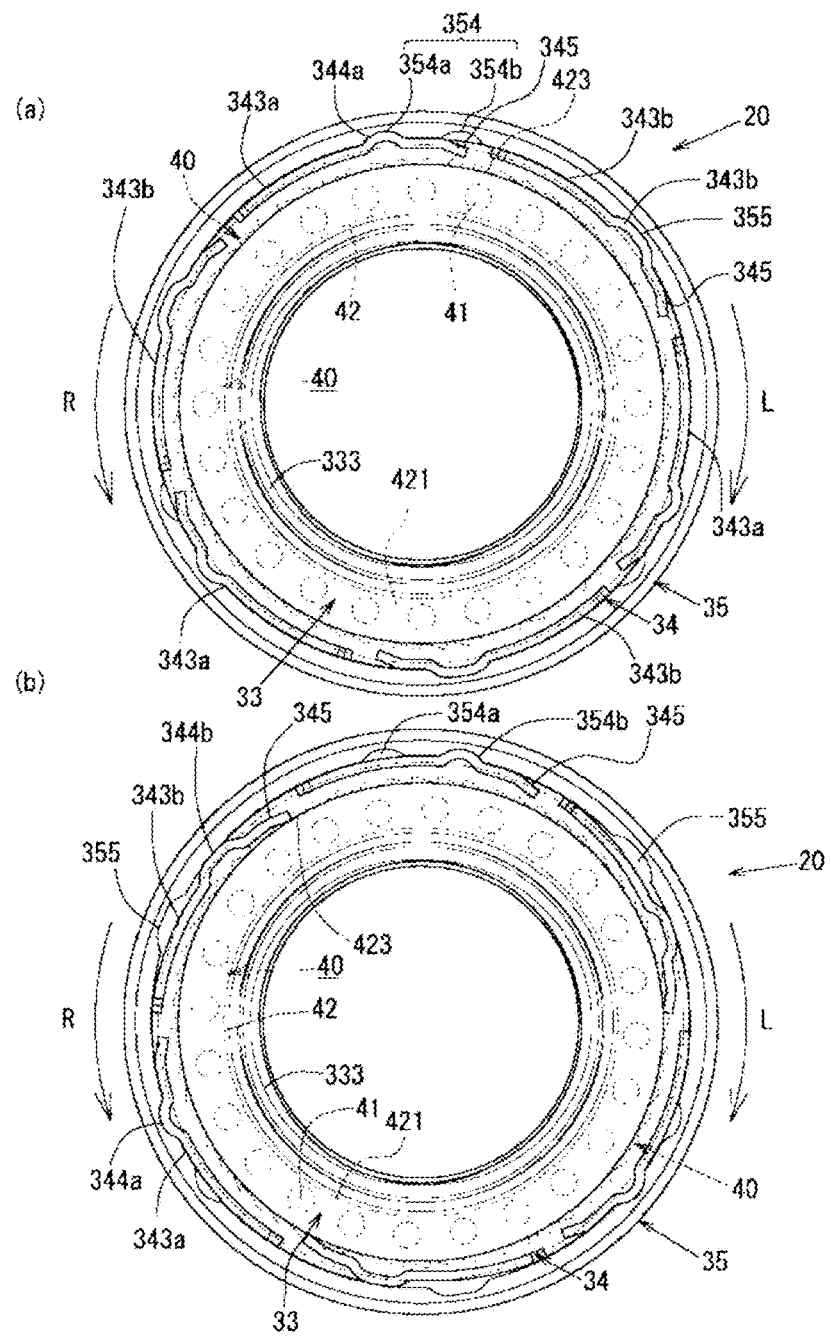
FIG. 8 is a view for explaining a rotation restriction switching mechanism in the chuck device.
Figure 9:
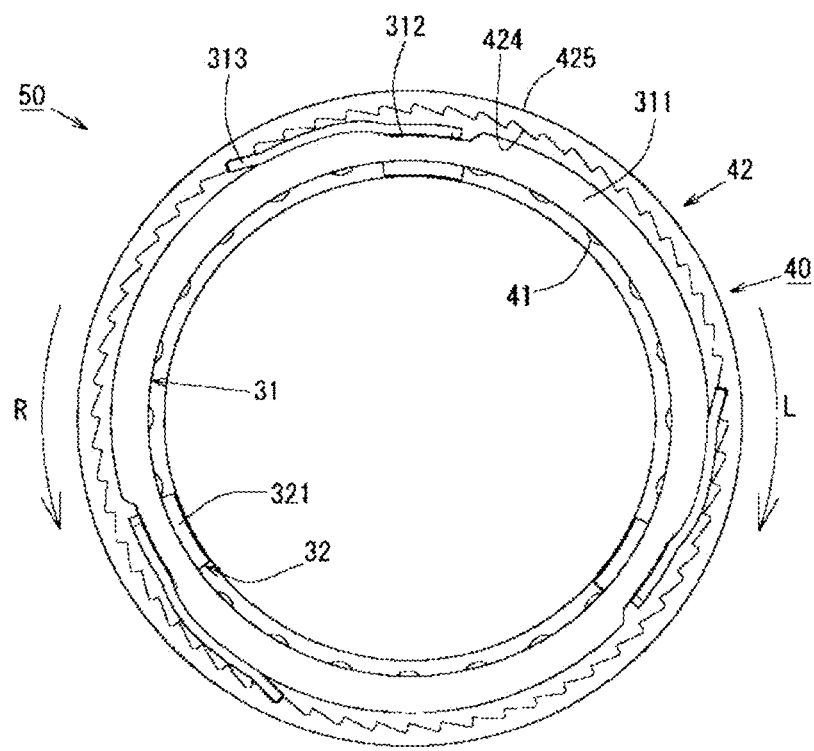
FIG. 9 is a back view of a one-way mechanism.
Figure 10:
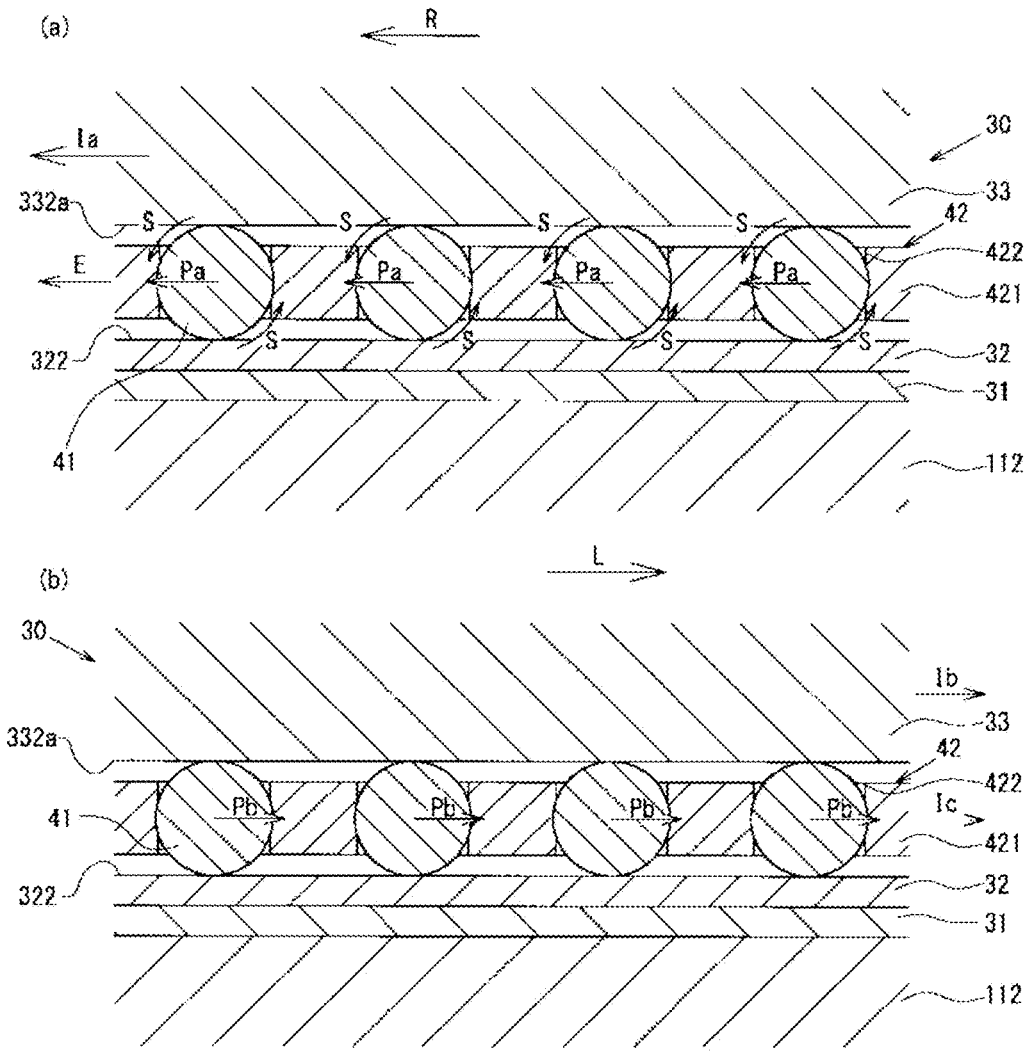
FIG. 10 is a view for explaining the bearing and lock mechanism.

FIG. 8 is a view for explaining a rotation restriction switching mechanism 20 in the chuck device 1, FIG. 9 is a back view of a one-way bearing mechanism 50, and FIG. 10 is a view for explaining the bearing and lock mechanism 30. In detail, FIG. 8(a) shows a back view of the rotation restriction switching mechanism 20 in a restriction released state and FIG. 8(b) shows a back view of the rotation restriction switching mechanism 20 in a rotation restricted state. Additionally, FIG. 10(a) shows a schematic view taken along a section passing the center of the balls 41 circularly arranged in a state where the bearing and lock mechanism 30 functions as a bearing mechanism, and FIG. 10(b) shows a schematic view showing a state where the bearing and lock mechanism 30 functions as a lock mechanism.

The chuck device 1 of the present invention is provided at a front end of the electric tool K. For example, the electric tool K includes a housing 2 having a handle portion 2a held by a user when used, and a spindle 4 provided in a front side of the housing 2.

Then, the chuck device 1 is attached to a front end of the spindle 4, so that the chuck device 1 tightens and fixes a base shaft 5a of a rotating jig 5. The spindle 4 is configured to be rotated due to rotation driving force of a motor M capable of forward/reverse rotation provided in the housing by operation of a trigger 6 arranged in the handle portion 2a.

The above chuck device 1 provided in the electric tool K, as shown in FIG. 2 to FIG. 4, is assembled with a chuck main body 10, the rotation restriction switching mechanism 20 and the bearing and lock mechanism 30 as main parts.

Specifically, from the rear side (upper left in FIG. 2) to the front side (upper right in FIG. 2), the back sleeve 13, the chuck main body 10, the one-way spring 31, the bearing ring 32, the ball bearing 40, the nut ring 33, the spring ring 34, the sleeve 35, the sleeve O ring 36, the O ring 37, and the nose piece 38 are arranged in this order.

Among the respective components configuring the chuck device 1, the one-way spring 31, the bearing ring 32, the ball bearing 40, the nut ring 33 and the spring ring 34 configure the bearing and lock mechanism 30, and among the respective components configuring the bearing and lock mechanism 30, the one-way spring 31, the bearing ring 32 and the ball bearing 40 configure the one-way bearing mechanism 50.

The chuck main body 10 is configured with the chuck body 11 and the jaw 12.

The chuck body 11 is configured with a rear trunk portion 111, a middle trunk portion 112 and a front trunk portion 113 from the rear side and is formed to have a generally cylindrical shape and have an insertion hole 114 provided at the center thereof in an axis direction X.

Then, at three positions in a circumferential direction of the chuck body 11, jaw attaching holes 115 are arranged which extend from the middle trunk portion 112 via the front trunk portion 113 and from an outer circumference side to an inner circumference side in a direction crossing the axis direction X so as to communicate with the insertion hole 114. The three jaw attaching holes 115 are formed to have extension lines in a radially inner direction crossing on the axis direction X.

Additionally, in the middle trunk portion 112, a fit-in portion 116 is formed between the jaw attaching holes 115, the fit-in portion being a semicircular groove which allows engagement of an engagement protrusion 321 which will be described later of the bearing ring 32.

The jaw 12 is formed to have a generally cylindrical shape with a thread groove 121 on an outer side surface at the rear side, the groove screwing with a thread 333 which will be described later of the nut ring 33. Further, on an inner side surface at the front side of the jaw 12, a press surface 122 generally parallel to the axis direction X is formed in a direction crossing an axis direction of the generally cylindrical shape, and on the center in a width direction of the press surface 122, a chip 123 made of carbide is provided. As described above, the jaw 12 having such a configuration is arranged such that the press surface 122 is parallel to the axis direction X, in three directions in the circumferential direction with respect to the axis direction X.

Inserting the jaw 12 into the jaw attaching holes 115 of the thus configured chuck body 11 configures the chuck main body 10. At this time, the jaw 12 is inserted into the jaw attaching holes 115 so as to have the thread groove 121 facing to radially outer side.

The back sleeve 13 forms a back of the chuck device 1 and is configured with a ring main body 132 having a circular opening 131 which allows insertion of the rear trunk portion 111 of the chuck body 11, an inner cylindrical portion 133 protruding forward in the axis direction X in an inner circumference of the ring main body 132 forming the circular opening 131, and an outer cylindrical portion 134 protruding forward in the axis direction X in an outer circumference of the ring main body 132.

The inner cylindrical portion 133 is formed to have an internal diameter that allows the rear trunk portion 111 of the chuck body 11 to press in, as well as being formed to be about twice as high as the outer cylindrical portion 134.

The one-way spring 31 includes a plate-ring-shaped ring main body 311 which fits into the middle trunk portion 112 of the chuck body 11, engagement arms 312 provided at three positions at equal intervals in a circumferential direction, the engagement arms protruding from an outer circumference of the ring main body 311 and being supported cantilevered in the circumferential direction, and an engagement pawl portion 313 provided at a front end of the engagement arms 312 so as to engage with an inner circumferential ratchet gear 424 which will be described later of the ball bearing 40.

The bearing ring 32 is a plate-shaped ring body which fits into the middle trunk portion 112 of the chuck body 11 and includes the semicircular engagement protrusions 321 provided at three positions at equal intervals in a circumferential direction, the engagement protrusions protruding from an inner circumference toward a radially inner side to engage with the fit-in portion 116 of the chuck body 11, thereby fixing rotation relative to the chuck body 11.

The retainer 42 configuring the ball bearing 40 together with the balls 41 which will be described later is configured with a ring-shaped retainer main body 421 having a thickness smaller than a diameter of the balls 41, and a rear tube portion 425 protruding to a rear side of the retainer main body 421. In the present embodiment, the retainer 42 is made of resin having a predetermined strength.

The retainer main body 421 has a plurality of holding holes 422 provided at predetermined intervals in a circumferential direction, the holding holes holding each of the plurality of balls 41 so as to be rotatable, and has an outer circumference ratchet gear 423 formed on an outer circumferential surface.

The holding holes 422 extend through the retainer main body 421 in a front and back direction and are arranged at equal intervals in the circumferential direction, and 30 holes are arranged in the present embodiment. Additionally, the holding holes 422 are each configured to have a central portion in a thickness direction extended according to a diameter of the balls 41 so as to prevent the balls 41 fit in the holding holes 422 from being pulled out of the holding holes 422.

The rear tube portion 425 protruding to the rear side of the retainer main body 421 has a cylindrical shape which allows the one-way spring 31 and the bearing ring 32 to fit therein and has the inner circumferential ratchet gear 424 formed on an inner circumference surface thereof.

Additionally, the inner circumferential ratchet gear 424 formed on the inner circumference surface of the rear tube portion 425 is configured with a ratchet gear directed to restrict relative rotation of the retainer 42 and the one-way spring 31 in a loosening direction L, and the outer circumference ratchet gear 423 is configured with a ratchet gear which restricts relative rotation of the spring ring 34 integrated with the nut ring 33 and the balls 41 in the loosening direction L.

The balls 41 forming the ball bearing 40 together with the retainer 42 are steel balls circularly arranged while being held in the holding holes 422 of the retainer 42 so as to be rotatable and in the present embodiment, 30 balls are provided according to the number of the holding holes 422.

In the ball bearing 40 configured with the balls 41 fit in the holding holes 422 of the thus configured retainer 42, the balls 41 protrude from the front and back of the retainer 42 and are held to be rotatable in the holding holes 422 as shown in an expanded view (a) of FIG. 2.

Rotation of each of the balls 41 in each of the holding holes 422 is referred to as "rotation S" in the present specification and rotation of the balls 41 with the center of the retainer 42 as a rotation center along with the rotation of the retainer 42 is referred to as "revolution P". Additionally, the rotation S of the balls 41 with a rotation center at the center of the retainer 42 in a thickness direction becomes rotation whose rotation center is the center of the retainer 42 in the thickness direction.

The nut ring 33 is configured with a ring-shaped ring main body 332 having a truncated cone-shaped opening 331 with a truncated cone-shape whose diameter is decreased toward the rear side in a sectional view, and on an inner surface of the ring main body 332 which forms the truncated cone-shaped opening 331, the thread 333 is formed which fits the thread groove 121 of the jaw 12.

The spring ring 34 is configured with a ring main body 341 which externally fits onto the nut ring 33 configured to be a ring, a front side protrusion 342 which protrudes from a front end of the ring main body 341 toward the front side, and an arm portion 343 which protrudes from a rear end of the ring main body 341 toward the rear side and extends in a circumferential direction.

The front side protrusion 342, which is to be inserted into a free-fit recessed portion 353 of the sleeve 35 to be described later so as to allow the sleeve 35 to differentially rotate at a predetermined rotation angle, is positioned according to the free-fit recessed portion 353 of the sleeve 35 which will be described later and is located at three positions at equal intervals in a circumferential direction.

As described above, the arm portion 343 includes a differential rotation restriction arm 343a which protrudes from the rear end of the ring main body 341 toward the rear side and has a reverse L-shape extending in the loosening direction L to engage with first engagement recessed portions 354a, 354b of the sleeve 35 which will be described later, and includes a lock arm 343b which engages with a second engagement recessed portion 355 and engages with the outer circumference ratchet gear 423 of the retainer 42 due to differential rotation, the differential rotation restriction arm 343a and the lock arm 343b being alternately arranged in the circumferential direction, thereby arranging a total of six arm portions 343.

The differential rotation restriction arm 343a has a first engagement projection portion 344a curvedly protruding to the radially outer side, and a ratchet pawl portion 345 provided at a front end of the projection portion, so that the first engagement projection portion 344a engages with the first engagement recessed portions 354a, 354b of the sleeve 35 to restrict differential rotation of the spring ring 34 relative to the sleeve 35.

The lock arm 343b is an arm portion which meshes with the outer circumference ratchet gear 423 to configure a ratchet mechanism, in which, a second engagement projection portion 344b curvedly protruding to the radially outer side is provided in the middle of the arm portion so as to engage with the second engagement recessed portion 355 of the sleeve 35 and the ratchet pawl portion 345 is provided at a front end of the arm portion The first engagement projection portion 344a of the differential rotation restriction arm 343a has a shape protruding semicircularly in a front view, while the second engagement projection portion 344b of the lock arm 343b has a shape protruding to have a semi-elliptical arc shape in a front view.

The sleeve 35 is generally bell-shaped in a side view, with a rear end side having the same diameter as that of the outer cylindrical portion 134 on the outer circumference of the back sleeve 13 and a front end side gradually narrowed, in which sleeve, an insertion space 351 extending along the axis direction X is internally provided that allows insertion of the jaw 12, and the middle trunk portion 112 and the front trunk portion 113 of the chuck body 11 configuring the chuck main body 10, and formed on an outer circumference is an O ring attachment groove 356 allowing attachment of the sleeve O ring 36 which will be described later.

Inside of the sleeve 35 which forms the insertion space 351, there are formed, from the front end side, a front end opening groove 352 in which the O ring 37 and the nose piece 38 to be described later fit, the free-fit recessed portion 353 which allows the front side protrusion 342 of the spring ring 34 to freely fit, and the first engagement recessed portions 354a, 354b with which the first engagement projection portion 344a of the differential rotation restriction arm 343a engages and the second engagement recessed portion 355 with which the second engagement projection portion 344b of the lock arm 343b engages.

The free-fit recessed portion 353 is formed to be wider in the circumferential direction than the front side protrusion 342 so as to allow the front side protrusion 342 to freely fit in the circumferential direction and is arranged at three positions at equal intervals in the circumferential direction.

As shown in an expanded view (b) of FIG. 2, the first engagement recessed portions 354a, 354b are grooves having a semicircular section according to the first engagement projection portion 344a of the differential rotation restriction arm 343a in a back view, and are arranged at three positions at equal intervals in the circumferential direction so as to correspond to the differential rotation restriction arm 343a.

The first engagement recessed portions 354a, 354b are arranged at an interval according to an amount of free-fit of the front side protrusion 342 relative to the free-fit recessed portion 353, i.e. an amount of differential rotation of the spring ring 34 relative to the sleeve 35.

In the restriction released state shown in FIG. 8(a), the second engagement recessed portion 355 is an engagement recessed portion with which the second engagement projection portion 344b of the lock arm 343b engages and is a groove having a semi-elliptical arc-shaped section in a front view corresponding to the lock arm 343b, and is arranged at three positions at equal intervals in the circumferential direction.

The sleeve O ring 36 is an O ring made of rubber which is attached to the O ring attachment groove 356 of the sleeve 35.

The O ring 37 is a ring body having a square section which is fit in the front end opening groove 352 of the sleeve 35 so as to be interposed between a flange portion 382 of the nose piece 38 which will be described later and the front end opening groove 352 of the sleeve 35.

The nose piece 38 is a tubular body inserted into the insertion space 351 from the front end side and configured with an external fitting portion 381 which externally fits onto a front end of the front trunk portion 113 of the chuck body 11, and the flange portion 382 which is expanded to the radially outer side at a front end of the external fitting portion 381 and is fit in the front end opening groove 352.

With the chuck device 1 having the thus configured elements, the rear trunk portion 111 of the chuck body 11 is first inserted into the circular opening 131 to attach the back sleeve 13 to the chuck body 11 from the rear side in the axis direction X.

Since the inner cylindrical portion 133 having an inner circumference formed to have a generally the same diameter as that of an outer circumference of the rear trunk portion 111 is pressed in the rear trunk portion 111 for attachment, the back sleeve 13 is attached to the chuck body 11 so as to have both the axis direction X and a rotation direction fixed.

Additionally, from the front side of the chuck body 11 with the jaw 12 inserted in the jaw attaching hole 115, the ball bearing 40 is attached which is configured with the one-way spring 31, the bearing ring 32, and the balls 41 fit in the holding holes 422 of the retainer 42.

At this time, the one-way spring 31 and the bearing ring 32 are inserted into the rear tube portion 425 of the retainer 42, so that the engagement pawl portion 313 formed in the engagement arm 312 of the one-way spring 31 engages with the inner circumferential ratchet gear 424, resulting in making relative rotation of the one-way spring 31 and the ball bearing 40 restricted in the loosening direction L and making the same rotatable in a tightening direction R.

Additionally, while the one-way spring 31 is rotatably attached to the chuck body 11, the bearing ring 32 is attached to the chuck body 11 so as to have rotation fixed but to be movable in the axis direction X because the engagement protrusion 321 fits the fit-in portion 116 of the chuck body 11.

Although the one-way spring 31, the bearing ring 32 and the ball bearing 40 configure the one-way bearing mechanism 50 in which rotation in the loosening direction L is restricted according a condition, the one-way bearing mechanism 50 is rotatable relative to the chuck body 11 in this assembly state.

Additionally, the ring main body 341 of the spring ring 34 is pressed in the nut ring 33 to make the spring ring 34 externally fit onto the nut ring. Accordingly, the nut ring 33 and the spring ring 34 are assembled to be fixed both in the axis direction X and the rotation direction.

Thus, the integrated nut ring 33 and spring ring 34 are attached from the front side of the chuck main body 10, and the thread grooves 121 of all the jaws 12 are screwed with the threads 333 of the nut ring 33 so as to be attached. At this time, at a radially outer side of the outer circumference ratchet gear 423 of the ball bearing 40 already attached to the chuck body 11, the arm portion 343 of the spring ring 34 is located, i.e. attachment is made such that positions of the outer circumference ratchet gear 423 and the arm portion 343 in the axis direction X coincide with each other.

Additionally, in this state of assembly of the chuck device 1, as shown in FIG. 10, the ball bearing 40 is arranged between the one-way spring 31 and the bearing ring 32, and the nut ring 33, and the balls 41 configuring the ball bearing 40 is sandwiched between a front surface 322 of the bearing ring 32 and a back surface 332a of the nut ring 33.

Then, further, the sleeve 35 is inserted from the front side of the chuck main body 10 such that a front end of the front trunk portion 113 is exposed from the front end opening groove 352 of the sleeve 35 further ahead thereof. At this time, the sleeve 35 is attached such that the front side protrusion 342 of the spring ring 34 already attached to the chuck main body 10 freely fits the free-fit recessed portion 353 of the sleeve 35, and an engagement projection portion 344 (344a, 344b) formed in the arm portion 343 (343a, 343b) of the spring ring 34 is fit in the engagement recessed portions 354, 355 of the sleeve 35, and further from the front side of the sleeve 35, the O ring 37 and the nose piece 38 are attached to end assembly of the chuck device 1.

At this time, the O ring 37 and the flange portion 382 of the nose piece 38 are fit in the front end opening groove 352 of the sleeve 35, and the external fitting portion 381 of the nose piece 38 is pressed in the front trunk portion 113 of the chuck body 11 from the front side. This causes the nose piece 38 to be assembled with the chuck body 11 so as to be fixed both in the axis direction X and the rotation direction, and the flange portion 382 of the nose piece 38 assembled with the chuck body 11 so as to be fixed both in the axis direction X and the rotation direction makes the sleeve 35 be fixed in the axis direction X so as to be rotatable relative to the chuck body 11 and the nose piece 38. The above order of the assembly of the chuck device 1 is one example and is not limited thereto, and assembly may be conducted in an appropriate order.

In the thus assembled chuck device 1, the ball bearing 40 configured with the retainer 42 and the balls 41 is sandwiched between the front surface 322 of the bearing ring 32 and the back surface 332a of the nut ring 33 to configure the bearing and lock mechanism 30.

Additionally, the rotation restriction switching mechanism 20 is configured with the spring ring 34, the sleeve 35 and the outer circumference ratchet gear 423 of the retainer 42 forming the ball bearing 40.

The rotation restriction switching mechanism 20 of the chuck device 1 assembled in the above manner is configured to be able to switch between the restriction released state shown in FIG. 8(a) and the rotation restricted state shown in FIG. 8(b).

To be described in detail, since in the restriction released state shown in FIG. 8(a), the first engagement projection portion 344a of the differential rotation restriction arm 343a fits in the first engagement recessed portion 354a of the sleeve 35, and the second engagement projection portion 344b of the lock arm 343b fits in the second engagement recessed portion 355 of the sleeve 35, the ratchet pawl portion 345 is located at a radially outer side due to urging force of the lock arm 343b, and the outer circumference ratchet gear 423 of the retainer 42 and the ratchet pawl portion 345 fail to engage with each other, so that the nut ring 33 and the spring ring 34 enter the restriction released state in which these rings are rotatable relative to the retainer 42 both in the tightening direction R and the loosening direction L.

Since the first engagement projection portion 344a of the differential rotation restriction arm 343a fits in the first engagement recessed portion 354a, and the second engagement projection portion 344b of the lock arm 343b fits in the second engagement recessed portion 355, i.e. the first engagement projection portion 344a fits in the first engagement recessed portion 354a due to urging force of the differential rotation restriction arm 343a, and the second engagement projection portion 344b fits in the second engagement recessed portion 355 due to urging force of the lock arm 343b, unless a predetermined rotation load acts, the restriction released state can be maintained.

With such a restriction released state, in the rotation restriction switching mechanism 20 in the rotation restricted state, as shown in FIG. 8(b), the second engagement projection portion 344b of the lock arm 343b fits in the first engagement recessed portion 354b, the second engagement projection portion 344b of the lock arm 343b is pushed to a radially inner side by an inner surface of the second engagement recessed portion 355 in the loosening direction L against urging force of the lock arm 343b, so that the outer circumference ratchet gear 423 of the retainer 42 and the ratchet pawl portion 345 engage with each other.

Thus, while the spring ring 34 is rotatable relative to the ball bearing 40 in the tightening direction R, rotation of the spring ring 34 relative to the ball bearing 40 in the loosening direction L is restricted by the engagement of the ratchet pawl portion 345 with the outer circumference ratchet gear 423.

Subsequently, detailed description will be made of operation of the chuck device 1 including the thus operating rotation restriction switching mechanism 20 and bearing and lock mechanism 30.

First, in the rotation restriction switching mechanism 20 in such a restriction released state as shown in FIG. 8(a), the base shaft 5a of the rotating jig 5 is inserted into the insertion hole 114 of the chuck body 11 from the front side and the sleeve 35 is rotated in the tightening direction R, so that the front side protrusion 342 freely fitting the free-fit recessed portion 353 of the sleeve 35 causes the nut ring 33 integrated with the spring ring 34 to rotate in the tightening direction R, and the three jaws 12 having the thread grooves 121 screwed with the threads 333 of the nut ring 33 proceed through the jaw attaching holes 115 in a slanting direction in synchronization with each other, resulting in holding and fixing the base shaft 5a of the rotating jig 5 inserted in the insertion hole 114 from three direction in a circumferential direction.

When the rotation restriction switching mechanism 20 is in the restriction released state, since the spring ring 34 and the ball bearing 40 are relatively rotatable as described above, the retainer 42 and the balls 41 sandwiched between the front surface 322 of the bearing ring 32 and the back surface 332a of the nut ring 33 function as a bearing mechanism of the bearing and lock mechanism 30.

In detail, as shown in FIG. 10(a), the nut ring 33 which rotates together with the spring ring 34 rotates relative to the bearing ring 32 fixed to the chuck body 11 in the tightening direction R as indicated by an arrow Ia. The rotation (the arrow Ia) of the nut ring 33 relative to the bearing ring 32 in the tightening direction R causes the balls 41 of the ball bearing 40 sandwiched between the front surface 322 of the bearing ring 32 and the back surface 332a of the nut ring 33 to revolve (arrow Pa) while rotating (arrow S).

While due to the revolution Pa of the balls 41, the retainer 42 rotates centered around the axis direction X, the revolution Pa of the balls 41 and the rotation of the retainer 42, i.e. the rotation (arrow E) of the ball bearing 40 becomes rotation in the same direction with a delay after the rotation (the arrow Ia) of the nut ring 33 relative to the bearing ring 32. In other words, with respect to the rotation of the nut ring 33 in the tightening direction R, the retainer 42 outputs a 1/2 rotation in the same direction due to the rotation S and the revolution Pa of the balls 41, thereby functioning as a differential rotation mechanism similar to a planetary gear.

Thus, in the holding state where the spring ring 34 is rotated in the tightening direction R to hold the base shaft 5a by the jaws 12, since with the thread groove 121 of the jaw 12 which holds and fixes the base shaft 5a as reaction force, the screwed nut ring 33 is fixed, when the sleeve 35 is further rotated in the tightening direction R by rotation force exceeding urging force of the differential rotation restriction arm 343a with the first engagement projection portion 344a fit in the first engagement recessed portion 354a and of the lock arm 343b with the second engagement projection portion 344b fit in the second engagement recessed portion 355, the sleeve 35 differentially rotates relative to the spring ring 34 integrated with the nut ring 33 in the tightening direction R by the amount of free-fit of the front side protrusion 342 fit in the free-fit recessed portion 353.

This differential rotation of the sleeve 35 relative to the spring ring 34 in the tightening direction R causes the first engagement projection portion 344a of the differential rotation restriction arm 343a, the first engagement projection portion being fit in the first engagement recessed portion 354a, to get over the first engagement recessed portion 354a and fit in the first engagement recessed portion 354b on the loosening direction L side. By contrast, the second engagement projection portion 344b of the lock arm 343b, the second engagement projection portion being fit in the second engagement recessed portion 355, gets over the second engagement recessed portion 355 and is urged to a radially inner side by an inner surface on the loosening direction L side than the second engagement recessed portion 355, so that the ratchet pawl portion 345 engages with the outer circumference ratchet gear 423 of the retainer 42, whereby the nut ring 33 and the spring ring 34, and the retainer 42 are allowed to relatively rotate with each other in the tightening direction R, but have rotations fixed in the loosening direction L in the rotation restricted state (see FIG. 8(b)).

Additionally, at this time, since with the jaws 12 holding the base shaft 5a as reaction force, the nut ring 33 moves to the rear side in the axis direction X, the bearing ring 32 is pressed to the rear side in the axis direction X via the balls 41 of the ball bearing 40, so that due to pressing of the bearing ring 32 toward the rear side in the axis direction X, the one-way spring 31 is sandwiched between the chuck body 11 and the bearing ring 32 to have rotation fixed relative to the chuck body 11.

In such a rotation restricted state, even when the nut ring 33 is about to rotate in the loosening direction L as indicated by an arrow Ib in FIG. 10(b), the rotation in the loosening direction L is restricted by the bearing and lock mechanism 30 to enter the locked state.

In detail, since in the above-described rotation restricted state, the nut ring 33 and the spring ring 34, and the retainer 42 have relative rotation in the loosening direction L restricted, when the nut ring 33 is about to rotate in the loosening direction L as indicated by the arrow Ib, the retainer 42 is about to rotate in the loosening direction L together with the balls 41 (an arrow Ic, an arrow Pb).

However, although the rotation of the retainer 42 causes the balls 41 fit in the holding holes 422 to make the revolution P in the same direction, the balls, which are sandwiched between the front surface 322 of the bearing ring 32 and the back surface 332a of the nut ring 33, rotate relative to the front surface 322 of the bearing ring 32 and rotate together with the back surface 332a of the nut ring 33, so that the balls 41 sandwiched between the front surface 322 of the bearing ring 32 and the back surface 332a of the nut ring 33 are not allowed to make the rotation S, and the rotation of the retainer 42 becomes the revolution Pb dragging the balls 41 not allowed to make the rotation S, resulting in making rotation of the retainer 42 locked with the balls 41 not allowed to make the rotation S as rotation loads.

Accordingly, with the rotation restriction switching mechanism 20 in the rotation restricted state, when the bearing and lock mechanism 30 enters the locked state, careless rotation of the nut ring 33 and the spring ring 34 in the loosening direction L can be restricted.

Additionally, since due to sandwiching between the chuck body 11 and the bearing ring 32, the engagement pawl portion 313 of the engagement arm 312 of the one-way spring 31 with rotation fixed relative to the chuck body 11 engages with the inner circumferential ratchet gear 424 of the retainer 42, the retainer 42 itself has rotation fixed in the loosening direction L relative to the chuck body 11 via the one-way spring 31, so that a more reliable locked state can be realized in combination with the above rotation restricted state in the loosening direction L obtained by the bearing and lock mechanism 30.

Since in the rotation restricted state, the first engagement projection portion 344a of the differential rotation restriction arm 343a fits in the first engagement recessed portion 354a while urging force of the differential rotation restriction arm 343a is acting, careless release of the rotation restricted state of the rotation restriction switching mechanism 20 contributing to the locked state of the bearing and lock mechanism 30 can be prevented.

Additionally, with the rotation restriction switching mechanism 20 in the above rotation restricted state, when the sleeve 35 is further rotated in the tightening direction R in which direction, the rotation relative to the retainer 42 is allowed, with the thread grooves 121 of the jaws 12 holding and fixing the base shaft 5a as reaction force, the nut ring 33 is pressed toward the rear side, i.e. the back surface 332a of the nut ring 33 comes closer to the front surface 322 of the bearing ring 32 to increase force of sandwiching the balls 41 by the front surface 322 of the bearing ring 32 and the back surface 332a of the nut ring 33. Therefore, frictional force generated between the balls 41 and the front surface 322 of the bearing ring 32 or the back surface 332a of the nut ring 33 is increased to make the above-described locked state be a firmer locked state.

Even if large rotation force exceeding the urging force of the differential rotation restriction arm 343a carelessly acts, such as vibration during driving, when coming out of the first engagement recessed portion 354b, the first engagement projection portion 344a of the differential rotation restriction arm 343a is urged to the radially inner side to make the ratchet pawl portion 345 of the differential rotation restriction arm 343a engage with the outer circumference ratchet gear 423 of the ball bearing 40, so that the differential rotation restriction arm 343a cantilevered from a base end portion is made to be supported by both the ratchet pawl portion 345 engaging the outer circumference ratchet gear 423 and the base end portion to increase urging force of the differential rotation restriction arm 343a in a radially outer direction, which arm has the first engagement projection portion 344a fit in the first engagement recessed portion 354b, so that the sleeve 35 is pushed back so as to make the first engagement projection portion 344a fit in the first engagement recessed portion 354b due to the increased urging force in the radially outer direction, thereby reliably maintaining the rotation restricted state of the rotation restriction switching mechanism 20 contributing to the locked state of the bearing and lock mechanism 30.

Although the ratchet pawl portion 345 of the differential rotation restriction arm 343a, which thus engages with the outer circumference ratchet gear 423 when careless rotation force acts, is formed to have the shape as that of the ratchet pawl portion 345 of the lock arm 343b in the present embodiment, when careless rotation force acts to cause the ratchet pawl portion to engage with the outer circumference ratchet gear 423 to make the differential rotation restriction arm 343a be supported also by the base end portion, it may have a shape different from that of the ratchet pawl portion 345 of the lock arm 343b.

Conversely, for releasing the locked state of the bearing and lock mechanism 30 by releasing the rotation restricted state of the rotation restriction switching mechanism 20, by inputting, from the sleeve 35, rotation force in the loosening direction L that allows the first engagement projection portion 344a of the differential rotation restriction arm 343a to come out of the first engagement recessed portion 354b against the urging force of the differential rotation restriction arm 343a, the second engagement projection portion 344b of the lock arm 343b having the ratchet pawl portion 345 engaging with the outer circumference ratchet gear 423 moves to a radially outer side due to the urging force of the lock arm 343b to fit in the second engagement recessed portion 355, and the ratchet pawl portion 345 goes away from the outer circumference ratchet gear 423 to release the above rotation restricted state, so that rotating the sleeve 35 together with the nut ring 33 in the loosening direction L leads to release of the locked state obtained by the bearing and lock mechanism 30, thereby releasing the base shaft 5a of the rotating jig 5 from being held by the jaws 12.

If in the above locked state, the base shaft 5a held by the jaws 12 is pulled out due to vibration during rotation driving or the like, the rotation restricted state obtained by the rotation restriction switching mechanism 20 and the locked state obtained by the bearing and lock mechanism 30 maintain.

In this state, when the sleeve 35 is rotated in the tightening direction R, although the rotation restricted state obtained by the rotation restriction switching mechanism 20 and the locked state obtained by the bearing and lock mechanism 30 maintain, fixed rotation of the one-way spring 31 due to sandwiching by the bearing ring 32 and the chuck body 11 is released in the one-way bearing mechanism 50. Therefore, in a state where the engagement pawl portion 313 remains engaged with the inner circumferential ratchet gear 424, i.e. in a state where the one-way spring 31 and the retainer 42 have rotations relative to each other in the loosening direction L remain restricted, and in a state where the ratchet pawl portion 345 remains engaged with the outer circumference ratchet gear 423 of the retainer 42, i.e. in a state where the spring ring 34 and the sleeve 35, and the retainer 42 have rotations relative to each other remain restricted in the loosening direction L, the sleeve 35, the spring ring 34, the retainer 42 and the one-way spring 31 having rotations relative to each other restricted in the loosening direction L are integrally allowed to rotate relative to the chuck body 11 in the loosening direction L without making sound of a ratchet.

Thus, the chuck device 1 to be attached to the motor M having the spindle 4 rotatable on an axis direction X is provided, the chuck device including the generally cylindrical chuck body 11 arranged on the axis direction X and having the insertion hole 114 at the front end side thereof, the insertion hole allowing insertion of the base shaft 5a of the rotating jig 5; the plurality of jaws 12 which communicate with the insertion hole 114 at the front end side in the chuck body 11, which, at the rear end side, are inserted into the jaw attaching holes 115 opened in the side of the chuck body 11, and which are arranged movably relative to the chuck body 11; the nut ring 33 which moves the plurality of jaws 12 in synchronization with each other in the slanting direction in the jaw attaching holes 115 by screwing with the chuck body 11 and the jaw 12; the plurality of balls 41 which rolls while being sandwiched between the nut ring 33 and the chuck body 11; the retainer 42 which holds the plurality of balls 41 so as to be rolled while being aligned, the retainer being rotatable relative to the chuck body 11 and the nut ring 33; the spring ring 34 configured to rotate together with the nut ring 33 and to switch between the rotation restricted state in which rotation of the retainer 42 in the loosening direction L is restricted and the restriction released state in which the restriction of the retainer 42 in the loosening direction L is released; and the one-way spring 31 which restricts the retainer 42 in the loosening direction L relative to the chuck body 11, in which the plurality of balls 41, the retainer 42 and the one-way spring 31 configure the one-way bearing mechanism 50 restricted in the loosening direction L between the nut ring 33 and the chuck body 11, and the retainer 42 in the rotation restricted state configures the bearing and lock mechanism 30 using the balls 41 sandwiched between the nut ring 33 and the chuck body 11 as rotation loads, so that without carelessly releasing the holding state of the base shaft 5a of the rotating jig 5, the holding state can be reliably locked.

Specifically, in the restriction released state obtained by the spring ring 34 capable of switching between the rotation restricted state and the restriction released state in the loosening direction L with respect to the retainer 42 which holds the plurality of balls 41 so as to be rolled while being aligned, the plurality of balls rolling while being sandwiched between the nut ring 33 which moves the plurality of jaws 12 in synchronization with each other through the jaw attaching holes 115 in the slanting direction and the chuck body 11, the plurality of balls 41, the retainer 42 and the one-way spring 31 configure the one-way bearing mechanism 50 functioning between the nut ring 33 and the chuck body 11, thereby enabling the jaws 12 to move through the jaw attaching holes 115 in the slanting direction in synchronization with each other by smoothly rotating the nut ring 33 relative to the chuck body 11.

Conversely, for example, when in the holding state where the base shaft 5a of the rotating jig 5 is held by moving the jaws 12, the spring ring 34 is switched to the rotation restricted state, the retainer 42 configures the bearing and lock mechanism 30 using the balls 41 sandwiched between the nut ring 33 and the chuck body 11 as rotation loads, so that such a holding state of the base shaft 5a as described above can be locked.

To be described in more detail, as described above, in a case where the one-way spring 31, the balls 41 and the retainer 42 function as the one-way bearing mechanism 50, due to rotation of the nut ring 33 relative to the chuck body 11, the plurality of balls 41 sandwiched between the chuck body 11 and the nut ring roll while being aligned in the retainer 42. Accordingly, the nut ring 33 is allowed to smoothly rotate relative to the chuck body 11.

At this time, the retainer 42, which holds the plurality of balls 41 so as to be rolled while being sandwiched between the chuck body 11 and the nut ring, rotates relative to the chuck body 11 as the balls 41 roll, with a delay after relative rotation of the nut ring 33. In other words, while both the nut ring 33 and the retainer 42 rotate in the same direction relative to the chuck body 11, the retainer 42, which makes relative rotation with a delay after relative rotation of the nut ring 33, rotates differentially relative to the nut ring 33.

However, in the rotation restricted state obtained by the spring ring 34, the retainer 42 and the nut ring 33 rotate in conjunction in the loosening direction L. Thus, along with the rotation of the nut ring 33 relative to the chuck body 11, the retainer 42 is about to make relative rotation together with the plurality of aligned balls 41. However, since the plurality of balls 41 aligned in the retainer 42 are sandwiched between the chuck body 11 and the nut ring 33 to generate friction between both contact parts, relative rotation of the retainer 42 prevents the balls from rolling. In other words, although the retainer 42 is to rotate relative to the chuck body 11 while dragging the balls 41 that are sandwiched between the nut ring 33 and the chuck body 11 and not allowed to rotate, frictional force of the balls 41 enables the retainer 42, i.e. relative rotation of the nut ring 33 to be locked.

Thus, according to the configuration of the present invention, depending on a state of the rotation restriction switching mechanism 20, the plurality of balls 41 and the retainer 42 realize both the one-way bearing mechanism 50 between the nut ring 33 and the chuck body 11, and the bearing and lock mechanism 30 with the balls 41 as rotation loads.

Additionally, since the inner circumferential ratchet gear 424 is provided on the inner circumference of the ring-shaped retainer 42, the bearing ring 32 is provided which is rotation-fixed to the chuck body 11, and the one-way spring 31 is provided with the engagement pawl portion 313 which engages with the inner circumferential ratchet gear 424 of the retainer 42, engagement of the engagement pawl portion 313 of the one-way spring 31 with the inner circumferential ratchet gear 424 of the retainer 42 enables the retainer 42 having the ratchet gear to be restricted in the loosening direction L relative to the chuck body 11 via the one-way spring 31 and the bearing ring 32.

Additionally, since the ring-shaped one-way spring 31 rotatably attached to the chuck body 11 is configured, with the nut ring 33 screwed with the chuck body 11 and the jaw 12 as reaction force, to be sandwiched between the ring-shaped bearing ring 32 which is rotation-fixed to the chuck body 11 and the chuck body 11, so that the one-way spring 31 is rotation-fixed relative to the chuck body 11, in a state where the base shaft 5a is held by the jaws 12, the retainer 42 is restricted in the loosening direction L relative to the chuck body 11 via the one-way spring 31, and in the other states, the retainer 42 is allowed to be rotatable relative to the chuck body 11.

To be described in detail, since the ring-shaped one-way spring 31 rotatably attached to the chuck body 11 is configured, with the nut ring 33 screwed with the chuck body 11 and the jaw 12 as reaction force, to be sandwiched between the ring-shaped bearing ring 32 which is rotation-fixed to the chuck body 11 and the chuck body 11, so that the one-way spring 31 is rotation-fixed relative to the chuck body 11, before the jaws 12 hold the base shaft 5a as a result of screwing of the nut ring 33, the one-way spring 31 is not sandwiched between the bearing ring 32 and the chuck body 11 with the nut ring 33 as reaction force, so that the one-way spring 31 becomes rotatable relative to the chuck body 11.

Therefore, the retainer 42 is not restricted in the loosening direction L relative to the chuck body 11. By contrast, when the nut ring 33 is clamped to hold the base shaft 5a by the jaws 12, with the nut ring 33 as reaction force, the bearing ring 32 and the chuck body 11 sandwich the one-way spring 31, so that the one-way spring 31 is fixed to the chuck body 11.

Thus, rotation of the retainer 42 is to be restricted in the loosening direction L relative to the chuck body 11 via the one-way spring 31 rotation-fixed to the chuck body 11. Thus, in a condition where the base shaft 5a is held by the jaws 12, the retainer 42 is restricted in the loosening direction L relative to the chuck body 11 via the one-way spring 31 which is rotation-fixed to the chuck body 11 and in a state where the base shaft 5a is not held by the jaws 12, since the one-way spring 31 is rotatable relative to the chuck body 11, the retainer 42 is also allowed to be rotatable relative to the chuck body 11.

Additionally, since the outer circumference ratchet gear 423 is provided on the outer circumference of the ring-shaped retainer 42, and the spring ring 34 is provided with the ratchet pawl portion 345 which engages with the retainer 42 via the outer circumference ratchet gear 423 in the rotation restricted state and separates from the outer circumference ratchet gear 423 in the restriction released state, the rotation restricted state can be reliably switched with ease with a simple structure.

To be described in detail, since the outer circumference ratchet gear 423 is provided on the outer circumference of the ring-shaped retainer 42, and the spring ring 34 is provided with the ratchet pawl portion 345 which engages with the retainer 42 via the outer circumference ratchet gear 423 in the rotation restricted state and separates from the outer circumference ratchet gear 423 in the restriction released state, engagement, with the outer circumference ratchet gear 423, of the ratchet pawl portion 345 of the spring ring 34 rotating together with the nut ring 33 enables relative rotation of the retainer 42 and the nut ring 33 in the loosening direction L to be restricted, and release of engagement of the ratchet pawl portion 345 with the outer circumference ratchet gear 423 makes the retainer 42 and the nut ring 33 be relatively rotatable, thereby allowing the rotation restricted state to be easily switched.

Additionally, since the sleeve 35 is provided which is rotatably attached to the chuck body 11, and which applies rotation force to the nut ring 33 by rotation operation and allows the nut ring 33 and the spring ring 34 to differentially move in a rotation direction of a predetermined angle, the spring ring 34 switches between the rotation restricted state and the restriction released state by differential rotation relative to the sleeve 35, so that the rotation restricted state and the restriction released state can be reliably switched with a simple structure.

Additionally, since the balls 41, the retainer 42 and the one-way spring 31 configure the one-way bearing mechanism 50 which functions between the nut ring 33 and the chuck body 11, the rotation restricted state and the restriction released state can be more reliably switched with a simpler structure.

In correspondence between the configuration of the present invention and the above described embodiment, the axis of the present invention corresponds to the axis direction X, and hereinafter similarly, the driving shaft corresponds to the spindle 4, the driving device corresponds to the motor M, the chuck device corresponds to the chuck device 1, the shaft hole corresponds to the insertion hole 114, the chuck main body corresponds to the chuck body 11, the slanting hole corresponds to the jaw attaching holes 115, the chuck pawl corresponds to the jaw 12, the rolling body and the ball correspond to the ball 41, the rotation in the loosening direction L corresponds to the loosening direction L, the first rotation restriction body corresponds to the spring ring 34, the second rotation restriction body corresponds to the one-way spring 31, the bearing mechanism corresponds to the one-way bearing mechanism 50, the lock mechanism corresponds to the bearing and lock mechanism 30, the rotation-fixing means and rotation-fixing ring correspond to the bearing ring 32, the second engaging pawl corresponds to the engagement pawl portion 313, the first engaging pawl corresponds to the ratchet pawl portion 345, and the rotation input body corresponds to the sleeve 35, but the present invention is not limited to the configuration of the above-described embodiment and various embodiments are applicable.

For example, the above chuck device 1 may be attached not only to the electric tool K having the rotatable spindle 4 but also to a rotational electric tool such as a vibration drill, an electric screw driver and the like.

Additionally, on the front surface 322 of the bearing ring 32 or on the back surface 332a of the nut ring 33, a shallow circular arc groove according to a diameter of the balls 41 may be formed at a position corresponding to a rotation trail in the revolution P of the balls 41 of the ball bearing 40. Thus, forming a circular arc groove on a rotation trail of the balls 41 enables frictional force to be increased between the balls 41 in the rotation restricted state and the front surface 322 of the bearing ring 32 or the back surface 332a of the nut ring 33, thereby further reliably obtaining the rotation restricted state.

Additionally, although the ball bearing 40 is configured with the balls 41 fit in the holding holes 422 of the retainer 42, any mode, not limited to the balls 41, is applicable, such as a roller, for example, that makes the center of a thickness direction of the retainer 42 be the center of the rotation S and is exposed from both the front and back of the retainer 42.

Additionally, although in the above description, the bearing ring 32 is provided, at equal intervals in the circumferential direction, with three semicircular engagement protrusions 321 which fix rotation relative to the chuck body 11, and the bearing ring 32 and the chuck body 11 sandwich the one-way spring 31 to restrict rotation of the one-way spring 31 relative to the chuck body 11, a plurality of engagement protrusions which fix rotation relative to the chuck body 11 may be provided on the inner circumference surface of the ring body of the one-way spring ring, thereby rotation-fixing the one-way spring 31 itself to the chuck body 11. In this case, the bearing ring 32 may be provided, or a bearing ring not having the engagement protrusion 321 may be provided, or the bearing ring 32 may not be provided.

Additionally, although the retainer 42 configuring the ball bearing 40 together with the balls 41 to be described later is configured with the retainer main body 421 and the rear tube portion 425 protruding to the rear side of the retainer main body 421 and is made of resin having a predetermined strength, the outer circumference ratchet gear 423 in the retainer main body 421 and the rear tube portion 425 may be integrated to be separate component from the ring body having a part of the holding holes 422 of the retainer main body 421. In this case, the ring body having the part of the holding holes 422 may be made of resin having a predetermined strength and the remaining part may be made of metal to be assembled to configure the retainer.

REFERENCE SIGNS LIST

1 CHUCK DEVICE
4 SPINDLE
5 ROTATING JIG
5a BASE SHAFT
11 CHUCK BODY
12 JAW
30 BEARING AND LOCK MECHANISM
31 ONE-WAY SPRING
32 BEARING RING
33 NUT RING
34 SPRING RING
35 SLEEVE
41 BALL
42 RETAINER
50 ONE-WAY BEARING MECHANISM
114 INSERTION HOLE
115 JAW ATTACHING HOLE
313 ENGAGEMENT PAWL PORTION
345 RATCHET PAWL PORTION
423 OUTER CIRCUMFERENCE RATCHET GEAR
424 INNER CIRCUMFERENTIAL RATCHET GEAR
L LOOSENING DIRECTION
M MOTOR
X AXIS DIRECTION
[FIG 5]
L LOOSENING DIRECTION
X AXIS DIRECTION

The invention claimed is:

1. A chuck device to be attached to a driving device having a driving shaft rotatable on an axis, the chuck device comprising:
   a generally cylindrical chuck main body arranged on the axis and having a shaft hole at a front end side thereof, the shaft hole allowing insertion of a base shaft of a rotating jig;
   a plurality of chuck pawls which communicate with the shaft hole at the front end side in the chuck main body, which, at a rear end side, are inserted into a slanting hole opened in a side of the chuck main body, and which are arranged movably relative to the chuck main body;
   a nut ring which moves the plurality of chuck pawls in synchronization with each other in a slanting direction in the slanting hole by screwing with the chuck main body and the chuck pawls;
   a plurality of rolling bodies which roll while being sandwiched between the nut ring and the chuck main body;
   a retainer which holds the plurality of rolling bodies so as to be rolled while being aligned, the retainer being rotatable relative to the chuck main body and the nut ring;
   a first rotation restriction body configured to rotate together with the nut ring and to switch between a rotation restricted state in which rotation of the retainer in a loosening direction is restricted and a restriction released state in which a restriction of the rotation of the retainer in the loosening direction is released; and
   a second rotation restriction body which restricts the rotation of the retainer in the loosening direction relative to the chuck main body,
   wherein the plurality of rolling bodies, the retainer, and the second rotation restriction body configure a bearing mechanism between the nut ring and the chuck main body, the bearing mechanism having rotation in a loosening direction being restricted, and
   the retainer, the rolling bodies, and the first rotation restriction body in the rotation restricted state configure a lock mechanism using the rolling bodies sandwiched between the nut ring and the chuck main body as rotation loads;
   wherein the retainer is formed to have a ring-shape and have an inner circumferential ratchet gear provided on a circumference thereof,
   the chuck device further comprising a rotation-fixing means which rotation-fixes the second rotation restriction body to the chuck main body,
   wherein the second rotation restriction body includes an engaging pawl which engages with the inner circumferential ratchet gear of the retainer.

2. The chuck device according to claim 1, wherein the rotation-fixing means is configured with a ring-shaped rotation-fixing ring which is rotation-fixed to the chuck main body,
   the second rotation restriction body is formed to have a ring-shape and to be rotatably attached to the chuck main body, and
   the second rotation restriction body is configured to be rotation-fixed to the chuck main body, with the second rotation restriction body sandwiched between the rotation-fixing ring and the chuck main body, using the nut ring screwed into the chuck main body and the chuck pawls as reaction force.

3. The chuck device according to claim 1, wherein an outer circumferential ratchet gear is provided on an outer circumference of the ring-shaped retainer, and
   the first rotation restriction body includes a first engaging pawl which engages with the retainer via the outer circumferential ratchet gear in the rotation restricted state and separates from the outer circumferential ratchet gear to release engagement in the restriction released state.

4. The chuck device according to claim 1, further comprising a rotation input body which is rotatably attached to the chuck main body, and which applies rotation force to the nut ring by rotation operation and allows the nut ring and the first rotation restriction body to differentially move in a rotation direction of a predetermined angle, wherein the first rotation restriction body is configured to switch between the rotation restricted state and the restriction released state by differential rotation relative to the rotation input body.

5. The chuck device according to claim 1, wherein
   the rolling bodies are each configured with a ball, and
   the ball, the retainer, and the second rotation restriction body configure a one-way ball bearing which functions between the nut ring and the chuck main body.

6. A chuck device to be attached to a driving device having a driving shaft rotatable on an axis, the chuck device comprising:
   a main body arranged on the axis;
   a plurality of chuck pawls in communication with the main body and movable relative to the main body;
   a nut ring coupled to the plurality of chuck pawls that operates to move the plurality of chuck pawls;
   a retainer that is rotatable relative to the main body and the nut ring, the retainer having an inner circumferential ratchet gear and an outer circumferential ratchet gear;
   a first rotation restriction body configured to rotate with the nut ring, the first rotation restriction body being configured to switch between:
      a rotation restricted state in which the first rotation restriction body is engaged with the outer circumferential ratchet gear and rotation of the retainer in a loosening direction is restricted, and
      a restriction released state in which a restriction of the rotation of the retainer in the loosening direction is released; and
   a second rotation restriction body rotatably attached to the main body, the second rotation restriction body being configured to restrict rotation of the retainer in the loosening direction relative to the main body via an engaging pawl that engages with the inner circumferential ratchet gear of the retainer.

7. The chuck device of claim 6, further comprising a plurality of rolling bodies held within the retainer which roll while being sandwiched between the nut ring and the chuck main body.

* * * * *